J. M. DODGE.
CHAIN LINKS.
APPLICATION FILED FEB. 27, 1911.
1,119,582.
Patented Dec. 1, 1914.
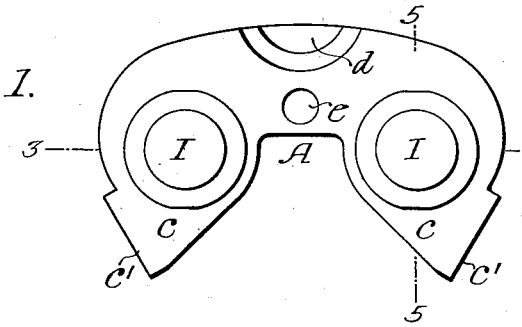
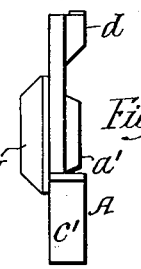
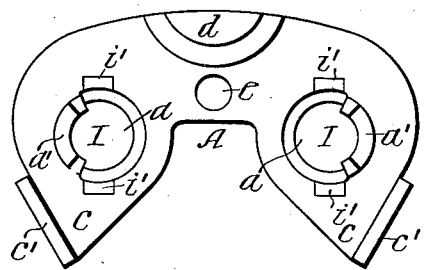
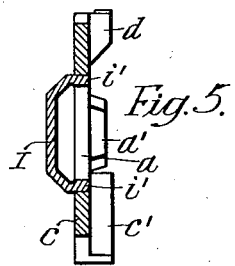
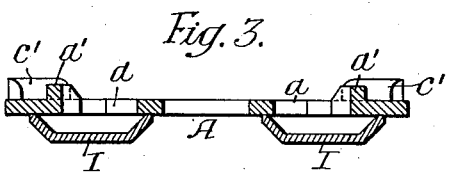
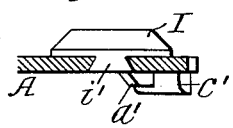
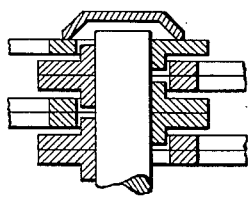
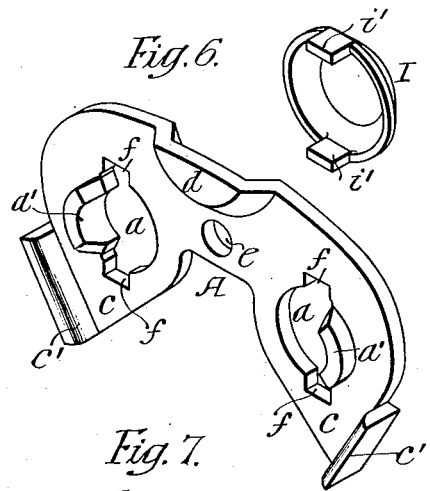
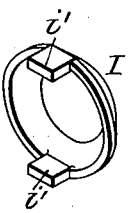
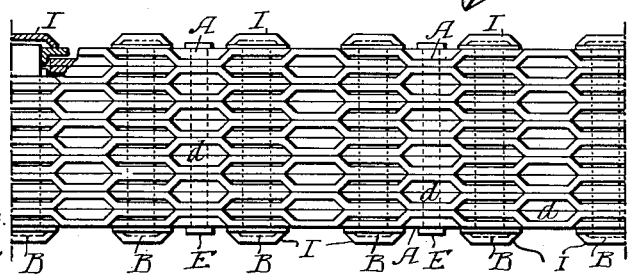
Inventor:—
James M. Dodge.
by his Attorneys
Howson & Howson
Witnesses:
William A. Shovis
Orila A. Burrows

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINKS.

1,119,582.   Specification of Letters Patent.   Patented Dec. 1, 1914.

Application filed February 27, 1911. Serial No. 611,008.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in the side plates of multi-plate chains, especially of the type having teeth which engage the teeth of a sprocket wheel around which the chain passes.

Heretofore, the usual practice has been to utilize the pivot pin coupling the plates of the links of a chain as a means of confining the assembled plates, but I find that this is objectionable and by the use of separate attaching means the pivot pin need be used only as a pivot pin. In order to allow it a certain longitudinal freedom I provide the side link plates with caps which extend over the ends of the pivot pins, and while allowing the pins a certain amount of freedom longitudinally, their movement is nevertheless limited.

The object of my invention is to provide separate caps for the side link plates which can be readily attached to the plates without welding or brazing and without the use of screws or other independent fastenings.

In the accompanying drawings: Figure 1, is a face view of one of the side link plates; Fig. 2, is a rear view of the same; Fig. 3, is a sectional plan view on the line 3—3 Fig. 1; Fig. 4, is an end view; Fig. 5, is a transverse sectional view on the line 5—5 Fig. 1; Fig. 6, is a perspective view showing the link plate and the caps detached; Fig 7, is a sectional view of a portion of the chain illustrating my invention; Fig. 8, is an enlarged sectional view of part of the chain shown in Fig. 7, and Fig. 9, is a view of a modification.

A is the link plate in the present instance made by striking up a plate of sheet metal to the form desired, and this link plate has two pivot pin openings $a$—$a$ with extended bearings $a'$, each conforming to a pivot pin B, Fig. 7.

$c$—$c$ are the teeth of the plate having extended bearings $c'$ which bear against the teeth of the sprocket wheel around which the chain passes.

$d$ is a lateral extension in the present instance which is pressed up from the plate and forms a bearing for a like extension on an adjoining link plate, the plates are thus spaced a given distance apart.

$e$ is a hole for the reception of the rivet E, which retains the several plates of the link in place.

In order to close the ends of the pivot pin openings I provide caps I and these caps are cupped and rest against the outer surface of the plate A, as clearly shown in Figs. 3 and 4. In order to attach these caps to the link plates I provide lugs $i'$, two in the present instance, which are forced into notches $f$ in the walls of the pivot pin openings $a$, as clearly shown in Fig. 6. When the cap is mounted on the plate and the lugs enter the recesses, the ends of the lugs are hammered down, forming a rivet which holds the cap firmly to the body of the link plate. I find that it is not necessary to enlarge the head of the riveted lug, but this may be done, if desired. In some instances where a great strain is to be placed upon the cap the construction may be used as illustrated in Fig. 9.

It will be noticed in Fig. 7, that when the several links are made up and assembled and the pins are in place, the pins are less in length than the distance between the cap on one side of the link and the cap on the opposite side of the link. This is of great advantage as it allows the pins a certain amount of longitudinal movement over the surface of the links, preventing grooving of the contacting parts.

While I have shown a rivet used in securing the plates of the links together, other means may be used for securing the plates without departing from the essential features of the invention.

I claim:—

1. The combination in a chain, of links; pivot pins connecting the links, the links being made of a number of link plates and forming a multi-plate chain, the outside link plates of the chain having recesses at the side of the openings for the pivot pins; and cupped caps extending over the ends of the pivot pins and having lugs projecting into the recesses and secured therein, the pivot pins being less in length than the distance between the inner walls of the opposite caps.

2. The combination of a chain link plate having two pivot pin openings; notches in the walls of each opening in the plate; and cupped caps mounted on the plate and having lugs extending into the notches and secured thereto, said cupped caps covering the pivot pin openings.

In testimony whereof, I have signed my name to this specification, in the presence of two subscribing witnesses.

JAMES M. DODGE.

Witnesses:
WM. E. SHUPE,
WM. A. BARR.